US007085967B2

(12) United States Patent
Elfering et al.

(10) Patent No.: US 7,085,967 B2
(45) Date of Patent: Aug. 1, 2006

(54) METHOD AND APPARATUS FOR FORMATTING VITAL COMPONENT DATA IN A FIELD REPLACEABLE UNIT OF A COMPUTER SYSTEM

(75) Inventors: Herwig G. Elfering, Offendorf (FR); Fritz Freier, Nagold (DE); Stephen Mark Igel, Rochester, MN (US); David Otto Lewis, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 10/366,847

(22) Filed: Feb. 14, 2003

(65) Prior Publication Data

US 2004/0163019 A1 Aug. 19, 2004

(51) Int. Cl.
*G06F 11/00* (2006.01)
(52) U.S. Cl. ....................................................... 714/52
(58) Field of Classification Search .................. 714/52, 714/57, 27, 768
See application file for complete search history.

(56) References Cited

U.S. PATENT DOCUMENTS

| 5,953,515 | A  | * | 9/1999  | Coteus et al. ................. 710/16 |
| 6,970,948 | B1 | * | 11/2005 | Brown et al. .................... 710/8 |
| 2002/0023181 | A1 | * | 2/2002 | Brown et al. .................... 710/8 |
| 2004/0073816 | A1 | * | 4/2004 | Hansen ....................... 713/300 |
| 2004/0078454 | A1 | * | 4/2004 | Abrahams et al. .......... 709/221 |

* cited by examiner

*Primary Examiner*—Nadeem Iqbal
(74) *Attorney, Agent, or Firm*—Roy W. Truelson (57) ABSTRACT

A flexible format for heterogeneous data records includes a fixed-length header containing a header ECC, a table of contents descriptor, and a table of contents ECC descriptor; a variable-length table of contents containing multiple entries, each entry containing a record descriptor and a corresponding record ECC descriptor; multiple variable-length records corresponding to the multiple entries in the table of contents; and optional ECCs corresponding to the ECC descriptors. Preferably, the format is used for vital component data in non-volatile memory of a computer system field replaceable unit, and is read by the system to identify the unit and configure the system.

16 Claims, 7 Drawing Sheets

METHOD AND APPARATUS FOR FORMATTING VITAL COMPONENT DATA IN A FIELD REPLACEABLE UNIT OF A COMPUTER SYSTEM

FIELD OF THE INVENTION

The present invention relates to digital data processing, and in particular to the storing and protecting of certain vital configuration data in components of a digital data processing system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system is an enormously complex machine, usually having many sub-parts or subsystems, each of which may be concurrently performing different functions in a cooperative, although partially autonomous, manner. Typically, the system comprises one or more central processing units (CPUs) which form the heart of the system, and which execute instructions contained in computer programs. Instructions and other data required by the programs executed by the CPUs are stored in memory, which often contains many heterogenous components and is hierarchical in design, containing a base memory or main memory and various caches at one or more levels. At another level, data is also stored in mass storage devices such as rotating disk drives, tape drives, and the like, from which it may be retrieved and loaded into memory. The system also includes hardware necessary to communicate with the outside world, such as input/output controllers; I/O devices attached thereto such as keyboards, monitors, printers, and so forth; and external communication devices for communicating with other digital systems. Internal communications buses and interfaces, which may also comprise many components and be arranged in a hierarchical or other design, provide paths for communicating data among the various system components.

For many reasons, computer systems are usually physically constructed of multiple modular components, each having some pre-defined interface to one or more other components. From the standpoint of the system, a modular component may be viewed as a "black box" which conforms to the pre-defined interface. Any component, regardless of internal structure, which conforms to the same pre-defined interface can be substituted for an existing component in the design of the computer system. This approach enables considerable flexibility in the design and configuration of computer systems. It is possible to improve the design of a computer system by improving the internal design of a modular component (while conforming to the same interface), without affecting other components of the system.

The modularization of computer components may be viewed at any of several levels of generality. At a relatively low level, individual logic gates on a semiconductor chip may be viewed as modular components. Functional units within the chip, such as an adder or an instruction decoder within a processor, are a higher level of modular component. The entire chip itself is also a modular component at still a higher level. This chip is usually mounted on a printed circuit board with other chips, connectors, and discrete components, the printed circuit board assembly being another level of modularity. Multiple circuit boards or other components may be constructed as a functional unit at a still higher level of modularity.

At some level of modularity, the component may be designed to be physically replaceable with an equivalent component after manufacture of the computer system. I.e., the component will be coupled to other components in the system using electrical connectors, clips, threaded fasteners, and the like, which are designed for coupling and uncoupling after manufacture. Such physically replaceable components are referred to as "field replaceable units" (FRUs). A finished electronic circuit board assembly, complete with all components soldered in place, is often designed as such a FRU, while an integrated circuit chip typically is not.

The use of such field replaceable units not only facilitates the replacement of a defective component with a new component of identical type after system manufacture. It also facilitates the re-configuration or upgrade of an existing physical computer system by substituting a newer or enhanced version of a FRU for the existing unit. For example, a memory card (i.e., an electronic circuit card assembly containing multiple memory chips) may sometimes be replaced with another memory card conforming to the same interface, but having more memory, or faster memory, or some other enhancement. Additionally, a computer system may be constructed with unused couplings, which provide support for later upgrading the computer system by attaching additional FRUs to the unused couplings. The use of multiple types of FRUs attached to generic couplings enables a basic computer system design to be configured in any one a very large number of configuration permutations.

Information concerning the physical configuration of a computer system generally needs to be maintained somewhere on the system in order to support any of various operating system and diagnostic functions. In early computer systems, such configuration information was often manually input by a system administrator. As systems have evolved, the task of collecting and maintaining configuration information has become increasingly automated in order to cope with growing system complexity, and the fact that many systems lack trained full-time administrators. To support configuration, diagnostics, and other automated functions, it is desirable to maintain self-identifying and diagnostic data for each FRU within the FRU itself. Accordingly, in some computer system designs, each FRU contains an on-board non-volatile data storage having certain vital component data. This vital component data may include, among other things, a device type, a serial number, a part number, a version number, functional parameters (such as an amount of memory available on a memory card), and so forth. Vital component data may be used by various system functions for purposes of verifying component compatibility, configuring low-level operating system functions, isolating system faults, and so forth. The on-board non-volatile data storage might also be used for storing data of lesser importance, such as a history of generated error codes.

Vital component data is generally vital, meaning that the system requires the data for proper operation, and any corruption of the data (even so much as a single bit) could have serious operational consequences. In most conventional memory devices, random bit errors are extremely rare. However, the fact that a FRU may be subject to extreme conditions of shipment, storage and handling increases the probability of a random bit error. Since any error in the vital data is unacceptable, vital data is often protected using some form of data redundancy, or error correcting code (ECC).

An ECC is a set of bits of pre-defined length and format, which enable the detection and correction of certain errors in a string of data bits of pre-defined length. By breaking data up into segments of pre-defined length and adding corresponding segments of ECC of known size and format, it is possible to protect any arbitrary data string from a single bit error, and in some cases to correct even multi-bit errors.

One of the requirements of ECC is that the data and ECC segments have a known, pre-defined format, since one must be able to distinguish the data bits from the bits of ECC. This works well where records being protected have a known, regular, fixed size. Unfortunately, vital component data tends to be heterogeneous in nature. Each record in the vital component data may be of a different size. Furthermore, different types of FRUs may employ different vital component parameters. Newer versions of the same type of FRU may contain additional vital component data records not contained in the back-level versions, or may contain data records of different size than those of the back-level versions.

It is possible to store vital component data in fixed-size blocks of data and ECC, but this approach generally either wastes storage space (because of padding or unnecessary protection of data less vital) or reduces flexibility to re-define the records of the vital component data. It is desirable to store certain data, such as vital component data, in a protected format which is more flexible, space efficient or otherwise advantageous compared with conventional techniques.

SUMMARY OF THE INVENTION

Variable length heterogeneous data having multiple records of varying length is stored as a fixed-length header containing a header ECC, a table of contents descriptor, and a table of contents ECC descriptor; a variable-length table of contents containing multiple entries, each entry containing a record descriptor and a corresponding record ECC descriptor; multiple variable-length records corresponding to the multiple entries in the table of contents; and optional ECCs corresponding to the ECC descriptors.

In the preferred embodiment, vital component data for a field replaceable unit is stored in on-board non-volatile memory of the FRU. A service processor or other processor reads the vital component data and verifies each record using the corresponding ECC, correcting any errors found with the ECC. The verified and corrected data may be used to identify the FRU to the system for purposes of configuration and compatibility verification, to diagnose faults, or for other purposes.

The flexible format for storing data is designed so that each record may optionally contain an ECC, independently of whether any other record contains an ECC (except for the header, which, being of fixed format, must contain an ECC). This is accomplished by providing a respective ECC descriptor for each record in the table of contents. Each record must have an ECC descriptor, but the descriptor could specify a null ECC. In the preferred embodiment, all vital data is protected by ECCs, including the table of contents itself. However, some data records considered less vital might be unprotected, i.e., contain no corresponding ECCs.

A data recording format according to the preferred embodiment of the present invention accommodates heterogenous data records of differing length in an efficient and flexible manner, facilitating modification of record sizes and addition of new records to support enhanced versions of the underlying field replaceable unit.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
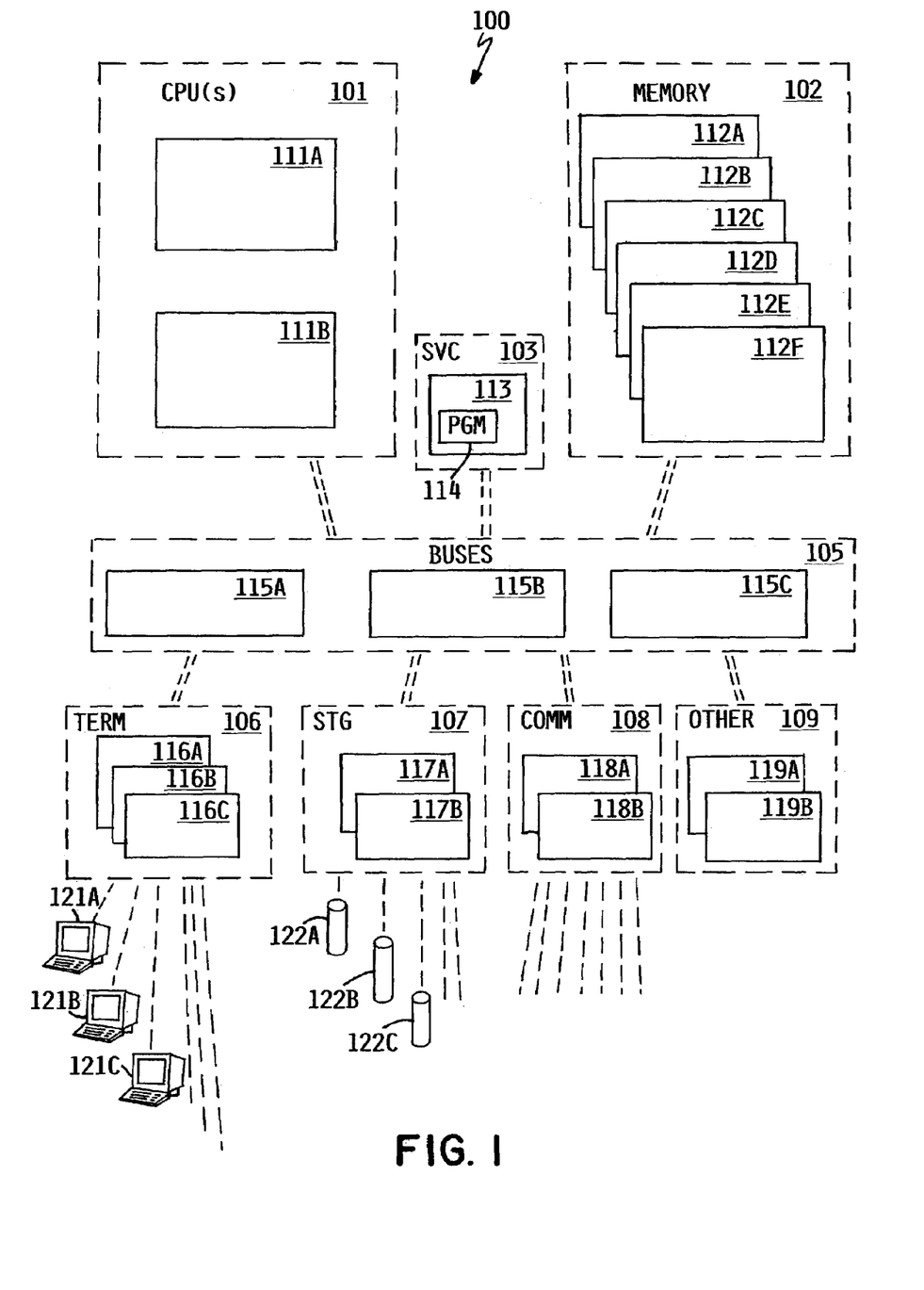
FIG. 1 is a high-level block diagram of the major hardware components of a computer system utilizing field replaceable units having formatted vital component data, according to the preferred embodiment of the present invention.

Referring to the Drawing, wherein like numbers denote like parts throughout the several views, FIG. 1 is a high-level representation of the major hardware components of a computer system 100 utilizing field replaceable units having specially formatted vital component data, according to the preferred embodiment of the present invention. At a functional level, the major components of system 100 are shown in FIG. 1 outlined in dashed lines; these components include one or more central processing units (CPU) 101, main memory 102, service processor 103, terminal interface 106, storage interface 107, communications interface 108, and other interfaces 109, all of which are coupled for inter-component communication via one or more buses 105.

CPU 101 is one or more general-purpose programmable processors, executing instructions stored in memory 102; system 100 may contain either a single CPU or multiple CPUs, either alternative being collectively represented by feature CPU 101 in FIG. 1, and may include one or more levels of on-board cache. Memory 102 is a random-access semiconductor memory for storing data and programs. Memory 102 is conceptually a single monolithic entity, it being understood that memory is often arranged in a hierarchy of caches and other memory devices. Additionally, memory 102 may be divided into portions associated with particular CPUs or sets of CPUs and particular buses, as in any of various so-called non-uniform memory access (NUMA) computer system architectures.

Service processor 103 is a special-purpose functional unit used for initializing the system, maintenance, and other low-level functions. In general, it does not execute user application programs, as does CPU 101. In the preferred embodiment, service processor 103 is responsible for reading and verifying vital component data from each field replaceable unit (FRU) in system 100, as described more fully herein. Preferably, service processor contains a programmable processor (not shown) and a resident memory for executing a control program 114, and is thus itself a small computer within a computer. However, reading and verifying vital component data could be performed by other system components, and system 100 need not necessarily have a dedicated service processor.

Terminal interface 106 provides a connection for the attachment of one or more user terminals 121A–C (referred to generally as 121), and may be implemented in a variety of ways. Many large server computer systems (mainframes) support the direct attachment of multiple terminals through terminal interface I/O processors, usually on one or more electronic circuit cards. Alternatively, interface 106 may provide a connection to a local area network to which terminals 121 are attached. Various other alternatives are possible. Data storage interface 107 provides an interface to one or more data storage devices 122A–C, (referred to generally as 122), which are preferably rotating magnetic hard disk drive units, although other types of data storage device could be used. Communications interface 108 provides one or more communications paths from system 100 to other digital devices and computer systems; such paths may include, e.g., Internet connections, local area networks, remote device communication lines, wireless connections, and so forth. Other device interface 109 provides an interface to other types of devices and components (not shown) of system 100; these could include I/O devices, such as printers, fax machines, magnetic readers, etc., or could also include auxiliary support systems, such as power supplies, switches, cooling fans, etc.

Buses 105 provide communication paths among the various system components. Although a single conceptual bus entity 105 is represented in FIG. 1, it will be understood that a typical computer system may have multiple buses, often arranged in a complex topology, such as point-to-point links in hierarchical, star or web configurations, multiple hierarchical busses, parallel and redundant paths, etc., and that separate buses may exist for communicating certain information, such as addresses or status information. In the preferred embodiment, a special bus runs from the FRU in which the service processor is located to other FRUs in the system, allowing the service processor to perform various functions independently of the high-speed data buses used for transferring data during normal system operation. However, such a special bus is not necessarily required.

Physically, the major functional units are constructed from one or more field replaceable units. Often, such a field replaceable unit is an electronic circuit card assembly. However, a FRU need not be an electronic circuit card assembly, and could alternatively be a component such as a disk drive storage device 122, a terminal 121, a power supply, and so forth. Additionally, a single FRU may have one or more FRUs within itself. For larger systems, a single major functional component, such as CPU 101 or memory 102, will often comprise multiple field replaceable units in the form of electronic circuit card assemblies, although it is alternatively possible for more than one major functional component to reside in a single FRU. In FIG. 1, CPU 101 is represented as containing two FRUs 111A–B, memory 102 is represented as containing six FRUs 112A–112F, service processor 103 as containing a single FRU 113, buses 105 as containing three FRUs 115A–C, terminal interface 106 as containing three FRUs 116A–116C, storage interface 107 as containing two FRUs 117A–117B, communications interface 108 as containing two FRUs 118A–B, and other device interface 109 as containing two FRUs 119A–B.

It should be understood that FIG. 1 is intended to depict the representative major components of an exemplary system 100 at a high level, that individual components may have greater complexity than represented FIG. 1, and that the number, type and configuration of such functional units and FRUs may vary considerably. It will further be understood that not all components shown in FIG. 1 may be present in a particular computer system, and that other components in addition to those shown may be present. Although system 100 is depicted as a multiple user system having multiple terminals, system 100 could alternatively be a single-user system, typically containing only a single user display and keyboard input.

Figure 2:
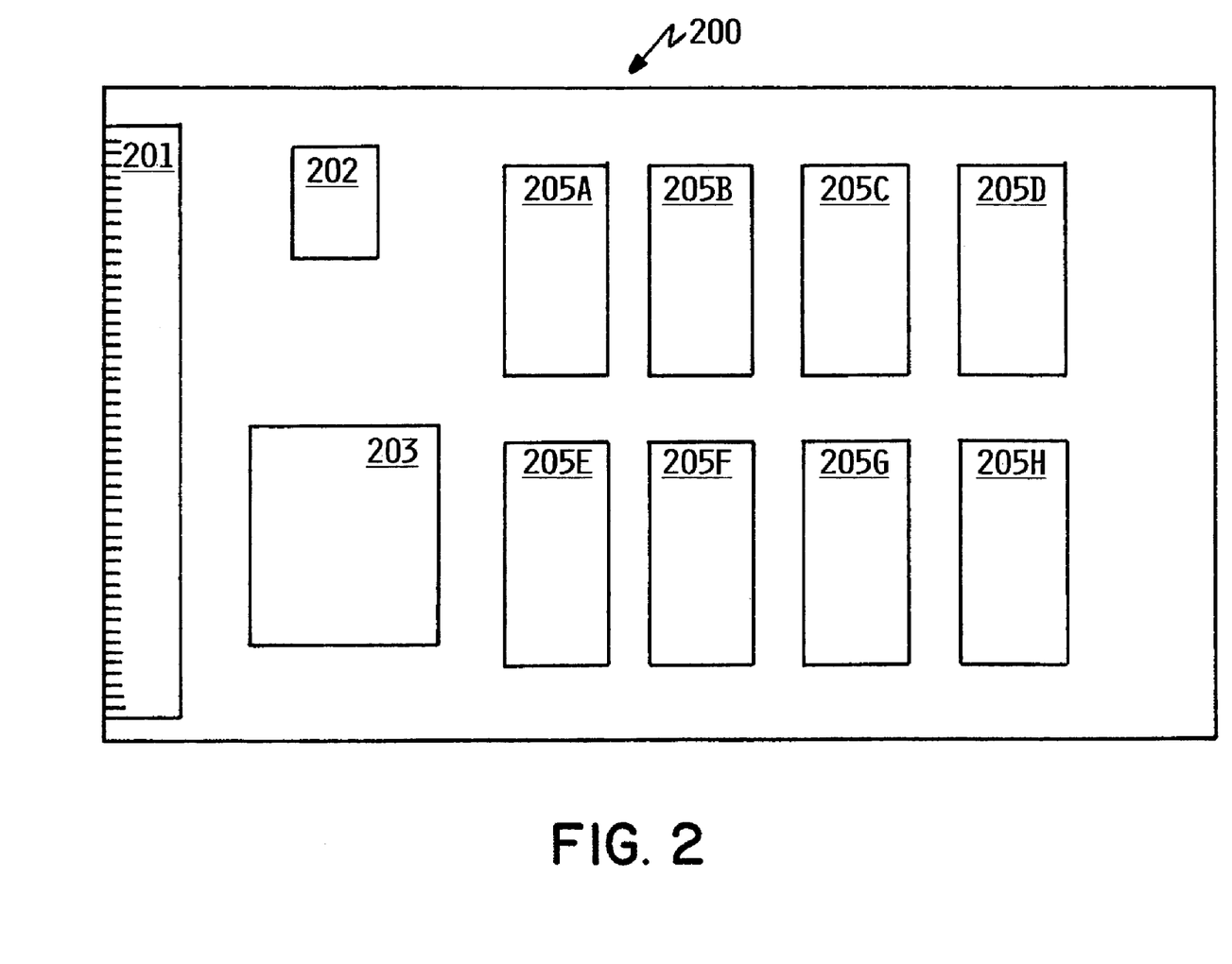
FIG. 2 is a simplified representation of a typical field replaceable unit (FRU) for using specially formatted vital component data, according to the preferred embodiment.

FIG. 2 is a simplified representation of a typical field replaceable unit (FRU) 200 for using specially formatted vital component data in accordance with the preferred embodiment. FRU 200 represented in FIG. 2 is an electronic circuit card assembly. However, it should be understood that a FRU in accordance with the preferred embodiment could be something other than an electronic circuit card assembly. A circuit card assembly is a thin, flat member having electrically conductive wire patterns on an insulator base material, such as fiberglass. Typically, a circuit card of any complexity has multiple layers of conductive patterns, which are separated by insulative layers to make a sandwich. Electronic components are mounted on one or both sides of the circuit card. Any of various appropriate techniques now known or hereafter developed for construction of circuit cards and mounting of components thereon may be used.

Components mounted on FRU 200 may include any of various integrated circuit modules, as well as discrete components such as resistors, capacitors, diodes, etc. (not shown). FRU 200 includes at least one pluggable connector 201 for mating with a complementary connector and forming electrical connections, thereby communicating with other circuit cards or other components of computer system 100. Also shown in FIG. 2 is an electronic interface module 203 which receives and sends signals passing through connector 201, and several functional modules 205A–H which perform some function associated with FRU 200. For example, functional modules 205A–H might be memory modules of a memory card. Functional modules 205A–H may be, but are not necessarily, identical.

FRU 200 further includes a non-volatile memory 202 for storing vital component data associated with the FRU. Non-volatile memory 202 can be anything that will store data in the absence of power being provided to the FRU. In the preferred embodiment, non-volatile memory 202 is an "I2C" serial EPROM semiconductor chip module. However, memory 202 could be other types of non-volatile memory, such as read-only memory or uv-erasable memory, or even other than semi-conductor memory, such as magnetic memory. In particular, memory 202 might alternatively be a "smart chip". Since data is only infrequently read from memory 202 and, in general, is read in large chunks or in its entirety, memory 202 need not be random-access memory.

FIG. 2 is intended as a high-level representation of a typical FRU (in this case, a circuit card assembly), the FRU having eight functional modules 205A–H, one interface 203, one non-volatile memory 203, and one connector 201. However, it will be understood that the number and type of components mounted on FRU 200 in accordance with the present invention may vary.

In accordance with the preferred embodiment of the present invention, certain data relating to each FRU including vital component data is stored in the FRU's non-volatile memory 202 in a flexible format which supports a variable number of records, variable length records, and ECC protection of data on a selective basis.

Figure 3:
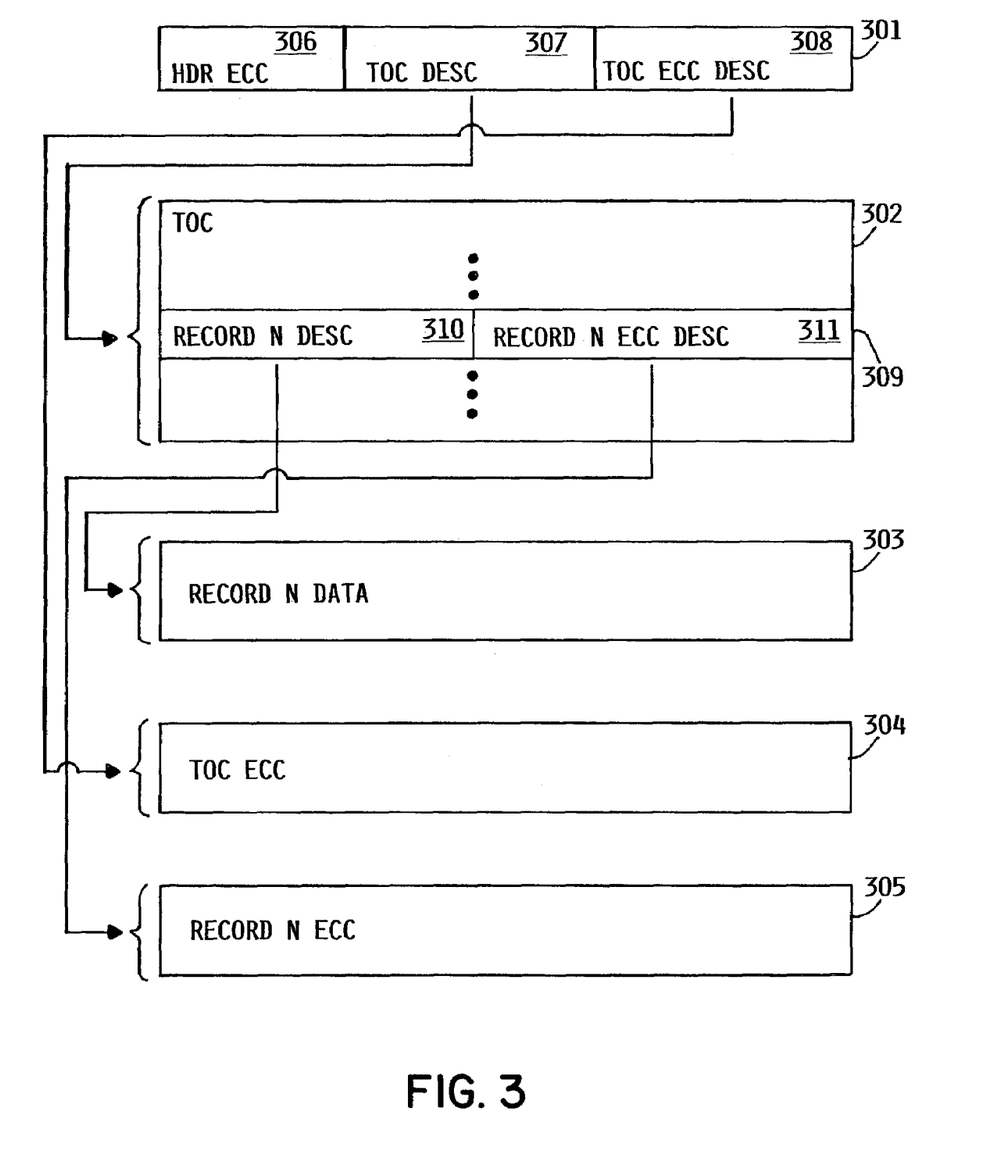
FIG. 3 is a generalized representation of the flexible format in which vital component data is stored in FRU non-volatile memory, according to the preferred embodiment.

FIG. 3 is a generalized illustration of the flexible format in which vital component data is stored in memory 202, according to the preferred embodiment. The generalized format consists of five parts: header 301, table of contents 302, one or more data records 303, an optional table of contents ECC 304, and one or more optional data record ECCs 305.

Table of contents descriptor 307 in header 301 identifies the location of table of contents 302 (as represented by the arrow in FIG. 3). Table of contents ECC descriptor 308 identifies whether an ECC for the table of contents 304 exists, and if so, identifies its location (as represented by the arrow). The table of contents contains a plurality of record index entries 309, each containing a record descriptor 310 identifying the location of a corresponding data record 303 (as represented by the arrow), and a corresponding record ECC descriptor 311, identifying the location of the ECC for the data record 305, if one exists. Thus, knowing only the location and format of the header 301, it is possible to determine the locations of all component records of the vital component data.

Figure 4:
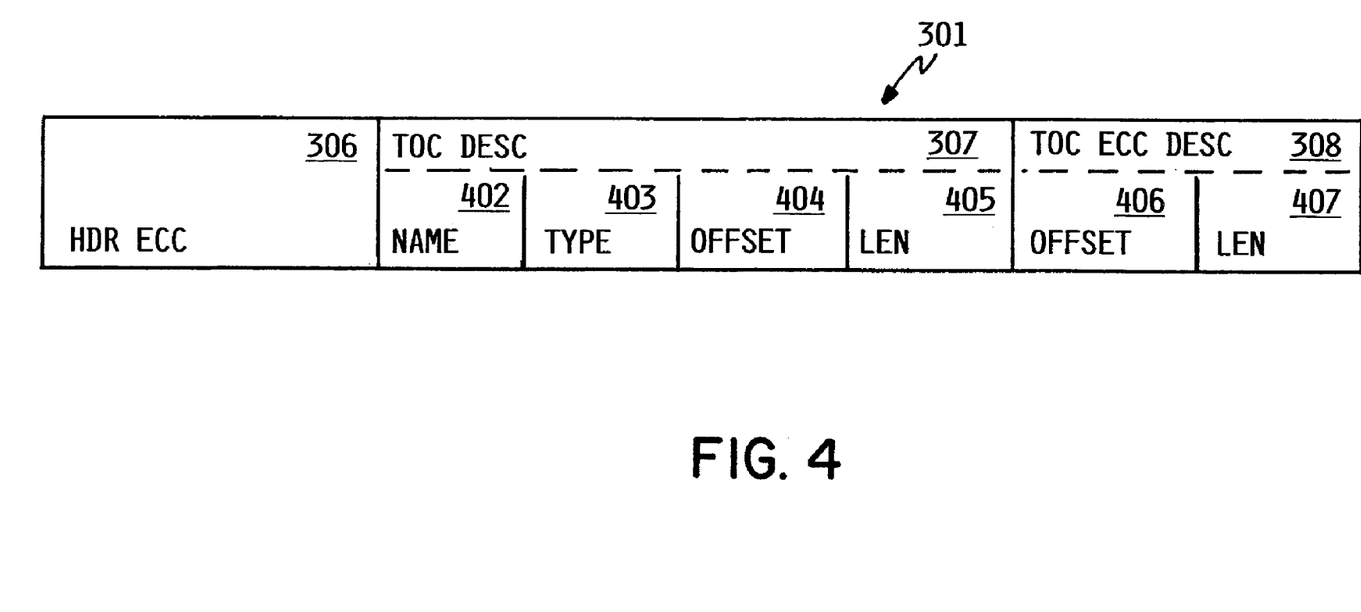
FIG. 4 shows in greater detail the format of a vital component data header, according to the preferred embodiment.

FIG. 4 shows in greater detail the format of header 301, according to the preferred embodiment. Header 301 is of a fixed overall length and format. It contains header ECC 306, table of contents descriptor 307, and table of contents ECC descriptor 308. The header ECC 306 contains the error correcting code for the header components, i.e., for the table of contents descriptor 307 and table of contents ECC descriptor 308. The header ECC 306 is required because the header must have a known format, although all other ECC components are optional. All of these header fields have a fixed length and location within header 301.

Table of contents descriptor 307 contains information sufficient to determine which data in memory 202 constitute the table of contents. In the preferred embodiment, the table of contents descriptor contains a record name field 402, a record type field 403, an offset 404 and a length 405. The length 405 is the length in bytes of the table of contents, while the offset 404 is a pointer to the starting location of the table of contents in memory 202 (preferably expressed as an offset from the start of the header). For an I2C serial EPROM memory and many other types of non-volatile memories, the information in offset 404 and length 405 is sufficient to identify the table of contents. In the preferred embodiment, table of contents descriptor also includes name field 402, which contains a name of the table of contents record. While this field is not strictly necessary in the header, it is included for additional flexibility and redundancy. Certain smart chip memories access data according to a record name, and providing a record name field in the fixed header format therefore provides an alternative method for accessing the table of contents, where such an alternate memory technology is used in the FRU. Record type field 403, which provides a record type, is also used in certain smart chip applications.

Table of contents ECC descriptor 308 contains information sufficient to determine which data in memory 202, if any, constitute the ECC for the table of contents. In the preferred embodiment, TOC ECC descriptor 308 contains offset field 406 and length field 407, which operate in a manner similar to offset 404 and length 405 of the TOC descriptor.

In the preferred embodiment, where there is no ECC for the table of contents, TOC ECC length field 407 contains a zero. In this case, the offset field 406 will not be used to determine an ECC location, and could conceivably contain anything (although the length field 407 must still occur at its pre-determined location in the header). It will be understood that the absence of an ECC could alternatively be indicated in any of various other ways, e.g., a special character in the offset field, a special flag field, a zero or a special reserved address in the offset field, etc.

Figure 5:
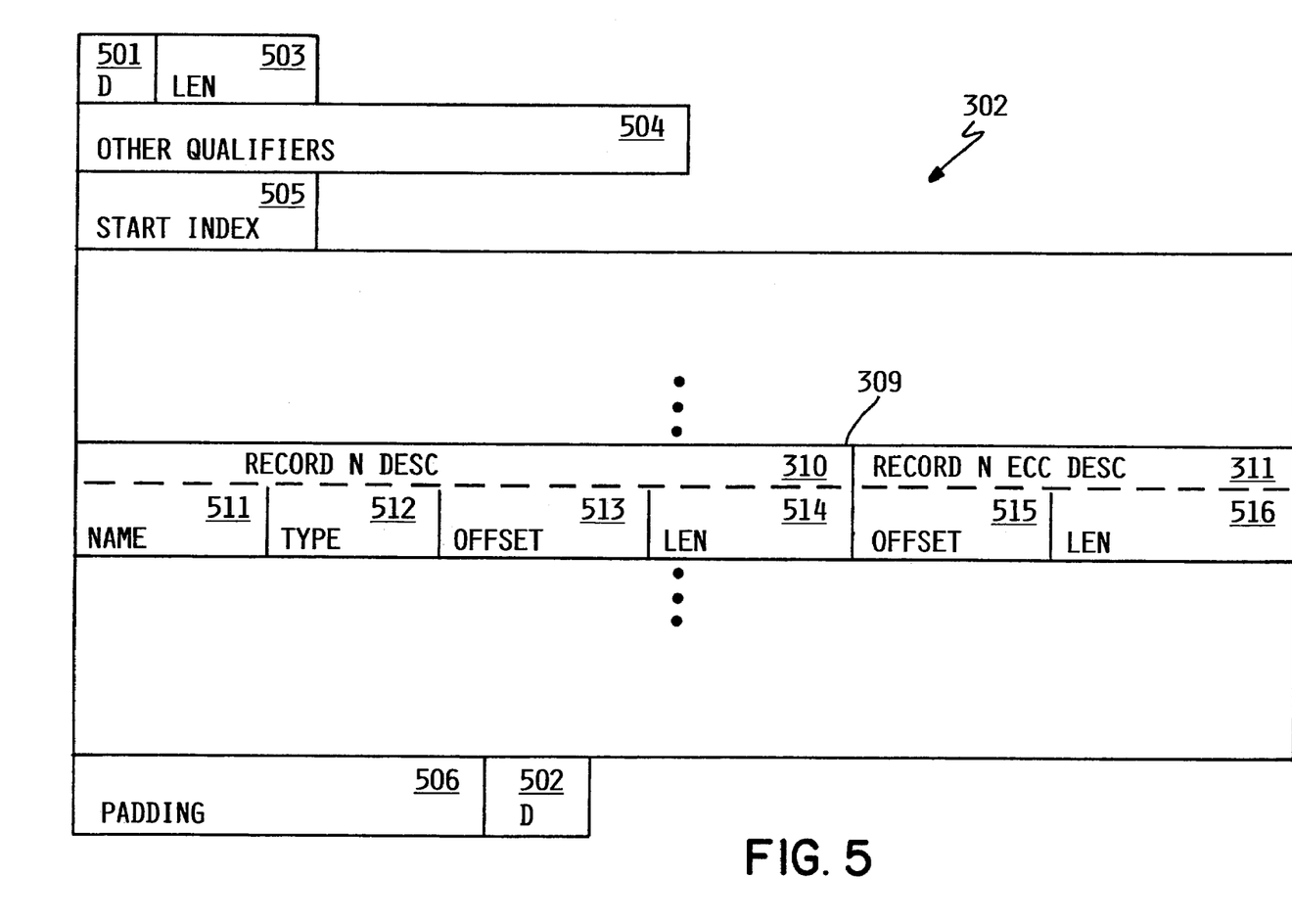
FIG. 5 shows in greater detail the format of a table of contents record for vital component data, according to the preferred embodiment.

FIG. 5 shows in greater detail the format of table of contents record 302, according to the preferred embodiment. Table of contents 302 begins with a delimiter 501, followed by record length field 503 (which duplicates the information in length field 405 of the header). This information may optionally be followed by one or more additional qualifiers 504, which are preferably in the form of tuples consisting of a keyword, a length for the parameter, and parameter data. For example, a tuple may contain a keyword indicating a name, a length for the name, such as 4 bytes, and the record name of the table of contents (duplicating the information in name field 402).

The actual table of contents entries are also in the form of a tuple. Specifically, a special keyword and length 505 identify the beginning of the table of contents index entries and the length of the entries. This is followed by the "parameter data", which in this case is one or more record index entries 309, each record index entry 309 corresponding to a data record portion 303 of the vital component data, and an optional ECC for the data record portion 305. The number of index entries 309 (and correspondingly, the number of data records 303) is not architecturally fixed, and consequently is unknown in advance to the service processor or other entity which reads the vital component data. The number of such entries is determined from the length part of the tuple (in the starting characters 505).

Each index entry contains a data record descriptor portion 310 and an ECC descriptor portion 311 for the data record. The record descriptor 310 contains information sufficient to determine which data in memory 202 constitute the corresponding record 303. In the preferred embodiment, the record descriptor contains record name field 511, record type field 512, offset field 513 and length field 514. Offset field 513 contains a starting address of the corresponding record 303, expressed as an offset from the beginning of the header. Length field 514 contains the length of the corresponding record 303. Collectively, offset 513 and length 514 are sufficient to determine which bytes of memory 202 constitute the corresponding record 303, assuming an I2C memory is used. Record name 511 and type 512 provide additional identifying data for the record, which may also be used in a smart chip memory implementation, where names instead of offsets are used to access data stored in a smart chip.

Record ECC descriptor 311 contains information sufficient to determine which data in memory 202, if any, constitute the ECC for the corresponding record. In the preferred embodiment, record ECC descriptor 311 contains offset field 515 and length field 516, which operate in a manner similar to offset 513 and length 514 of the record descriptor. Where there is no ECC for the record, the record ECC length field 516 is set to zero, and the offset field 515 is not defined (could contain any data).

The record index entries 309 are followed by padding 506 and an ending delimiter 502. Padding 506 is also in the form of a tuple, using a special keyword and length, and dummy data. Padding 506 is included so that table of contents record 302 ends on a word boundary.

It will be observed that the formatting of each portion of the table of contents as tuples, as described above, not only permits additional data to be added to the table of contents, but allows greater flexibility in the format of index entries themselves. I.e., if in future versions of FRUs, it is desirable to put additional information in each index entry 309, it would be possible to define a new keyword to indicate the start of index 505, which would imply a different format for each respective index entry. Of course, the service processor must be able to recognize both the old keyword and the new keyword in order to read vital component data in older as well as newer FRUs. Each newer FRU could carry duplicate index entries, one using the older format and one using the newer format. Any back level service processor would then be able to read the older format (ignoring the newer keyword, which it would not recognize), while a newer service processor would recognize both keywords and ignore the older one.

There is no architecturally fixed format or length for the records 303. The length of a record is specified by the length field 514 within the record descriptor 310. Each record begin and ends with a delimiter, but there are no architectural limitations on the formatting of data within a record. The formatting of data within a record is determined by the record name. I.e., the name of a record defines the type of data stored therein and its format. New formats and new information can be added to future versions of a FRU by defining new record names.

The various parts of the vital component data shown in FIG. 3 may be contiguous or not, and may appear in different order from that illustrated in FIG. 3, although the format of the preferred embodiment expects that the table of contents itself reside in contiguous memory, and that each individual record itself reside in contiguous memory. It will be understood that although only one data record 303 and one data record ECC is illustrated in FIG. 3, the actual number of such records and ECCs may vary.

Vital component data in a FRU may be used for various purposes. In general, it may be said that the vital component data identifies the FRU and its characteristics to the system. Because the data is stored in non-volatile memory 202, the data remains in the FRU even if the FRU is not receiving power from the system, and even if the FRU is not installed in any system. It is anticipated that certain critical vital component data be written into non-volatile memory 202 at the time of manufacture of the FRU. It is optionally possible that some data will be added later. Specifically, relatively permanent data such as data identifying the type of FRU (e.g., memory card, processor card, etc.), the essential operating parameters (e.g., in the case of a memory card, the amount of memory on the card), serial number, version or level, and so forth, will be written to the FRU at time of manufacture. Field history data for maintenance, warranty and other uses, such as error statistics, number of power-on hours, and so forth, might be written to the FRU after it is installed in the computer system and periodically updated.

When FRU 200 is installed in computer system 100, the control program of the service processor 103 reads the vital component data in memory 202 upon the occurrence of any of various triggering events. Preferably, service processor 103 reads the vital component data of all FRUs in the system whenever the system is re-initialized upon power-up or in response to a re-initialization command or other condition forcing a re-initialization. In addition, the service processor reads vital component data whenever a change in system configuration is made (whether or not it triggers a re-initialization), such as when a FRU is added to the system. Various other events, such as certain error conditions, might also trigger the reading of vital component data. Although in the preferred embodiment, vital component data is read by a control program executing on the service processor, it could also be read by a similar program executing on one of the CPUs, or by some other system component.

The service processor may use the vital component data for any of various purposes, but in particular, it is used to automatically configure the system. Each FRU effectively reports its own device identity and key operating parameters to the service processor, without human intervention. From this data, the service processor is able to build a record of the system, and configure certain low-level system operating parameters accordingly. For example, the service processor is able to determine the number and type of processors available (and hence determine a measure of total processing capacity); the size of main memory available, the number of buses and certain I/O devices, and so forth.

Figure 6A:
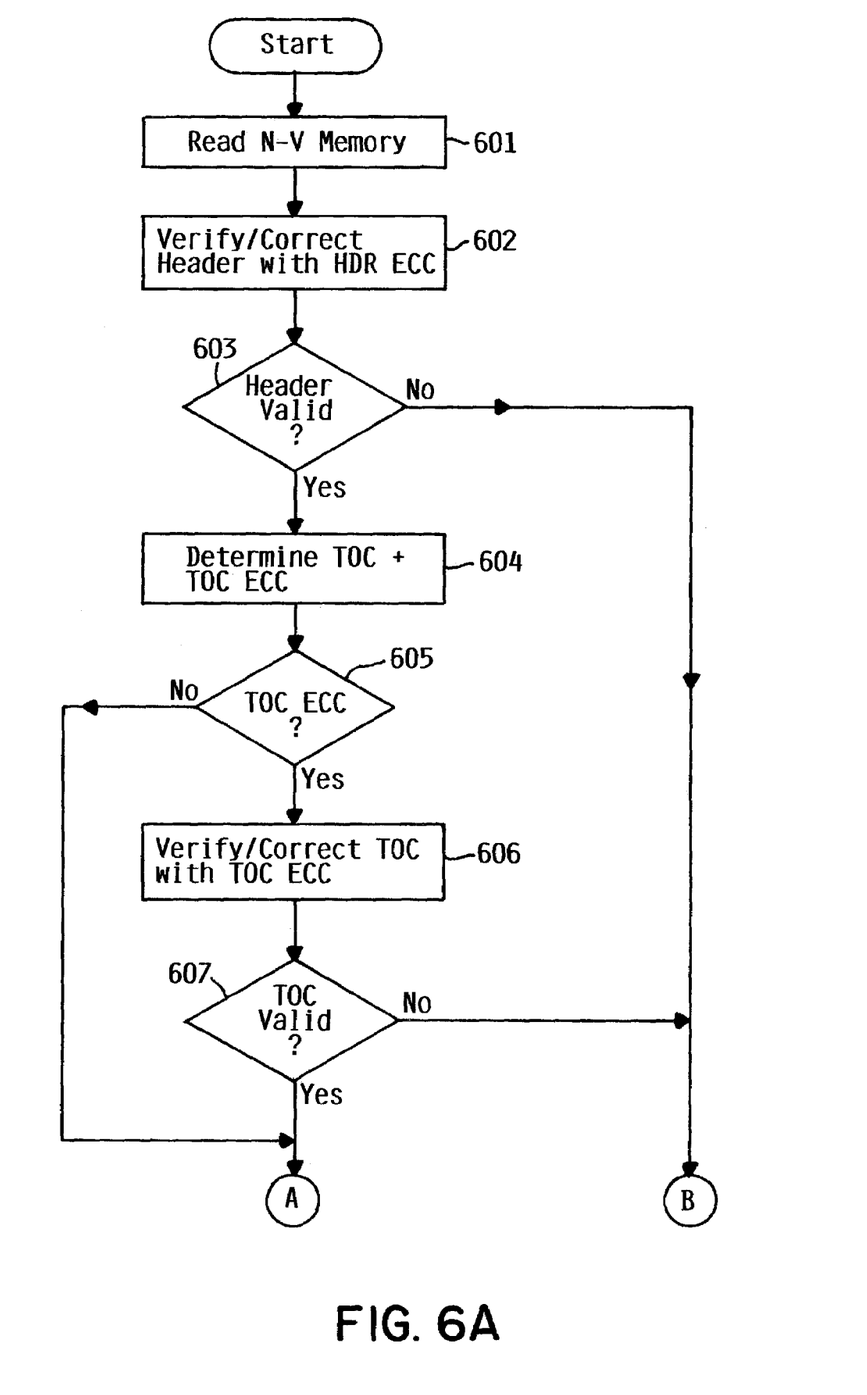
FIGS. 6A and 6B (herein referred to collectively as FIG. 6) are a high-level flow diagram showing the process of reading and interpreting vital component data from a FRU, according to the preferred embodiment.
Figure 6B:
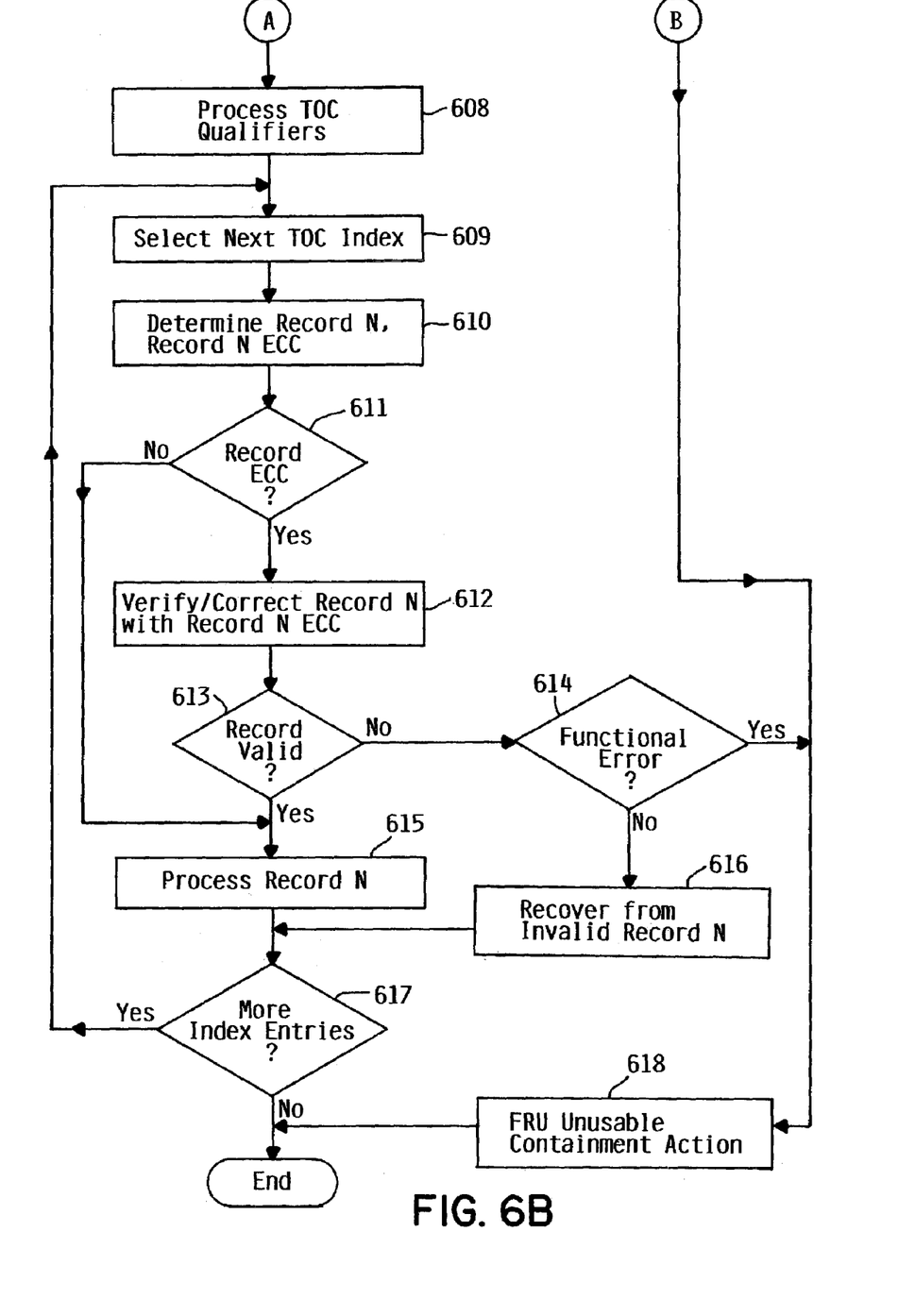

FIGS. 6A and 6B (herein referred to collectively as FIG. 6) are a high-level flow diagram showing the process of reading and interpreting vital component data from a FRU performed by the service processor control program, according to the preferred embodiment. FIG. 6 represents the process of reading data in a single FRU, it being understood that in the preferred embodiment, the service processor typically reads vital component data from all the FRUs as part of a system configuration or initialization process.

In the preferred embodiment, the entire non-volatile memory 202 is read into the service processor for decoding (step 601). This method is used because the I2C EPROM uses serial access. Depending on the memory technology used, it would alternatively be possible to read large blocks of memory or individual records as needed. In particular, where a smart chip is used to store the vital component data, the data would likely be read one record at a time, by specifying a record name to the smart chip. It will be understood that, in these cases, the sequence of operations will vary slightly from that illustrated in FIG. 6.

At this point, the service processor knows only the location and format of the header 301 in the data stream. The service processor extracts header ECC 306 from the data stream and verifies the header contents, correcting the header contents if necessary using header ECC 306 (step 602).

If, after any necessary correction, the header is determined to be valid, the "Y" branch is taken from step 603. In this case, the service processor extracts the table of contents descriptor information 307 and table of contents ECC descriptor 308 from the header, thereby determining the location and length of the table of contents and any ECC associated therewith (step 604). If the header is not valid, the "N" branch is taken from step 603, and appropriate action is taken at step 618.

If the table of contents ECC descriptor specifies an ECC for the table of contents (i.e., if length field 407 is non-zero), the "Y" branch is taken from step 605. In this case, the service processor extracts the table of contents ECC 304 from the data stream read from memory 202 at the location indicated by table of contents ECC descriptor 308. The table of contents descriptor 307 indicates the location of table of contents 302. The TOC ECC 304 is then used to verify table of contents 302, correcting any errors as necessary using the table of contents ECC 304 (step 606).

If, after any necessary correction, the table of contents 302 is determined to be valid, the "Y" branch is taken from step 607, and processing of the table of contents continues at step 608. If the table of contents is not valid, the "N" branch is taken from step 607, and appropriate action is taken at step 618.

If, at step 605, the TOC ECC descriptor specifies no TOC ECC (length field 407 set to zero), the "N" branch from step 605 is taken, and steps 606 and 607 are by-passed.

Having identified and verified the table of contents, the service processor then processes the individual components of the table of contents. It identifies length field 503, and other qualifiers 504, and the beginning and length of the index entries 505 (step 608). The various index entries are then individually identified with their corresponding records.

A next index entry 309 is selected from the table of contents (step 609). The record descriptor 310 for the corresponding record (designated record N) and the record N ECC descriptor 311 are extracted to determine the location of record N and its ECC (step 610). If the record ECC descriptor 311 indicates that there is an ECC for the corresponding record (i.e., if length field 516 in non-zero), then the "Y" branch is taken from step 611. In this case, the service processor extracts the record N ECC 305 from the data stream read from memory 202 at the location indicated by record N ECC descriptor 311. The record N descriptor 310 (specifically, the offset 513 and length 514) indicates the location of record N 303. The record N ECC 305 is then used to verify the corresponding record N 303, correcting any errors as necessary using the record N ECC (step 612).

If, after any necessary correction, record N 303 is determined to be valid, the "Y" branch is taken from step 613, and processing of the corresponding record continues at step 615. If record N is not valid, the "N" branch is taken from step 613, and appropriate action is taken at steps 614, 616 and 618.

If, at step 611, the record N ECC descriptor specifies no ECC for the corresponding record (length field 516 set to zero), the "N" branch from step 611 is taken, and steps 612 and 613 are by-passed.

If record N is valid ("Y" branch from step 613) or the ECC is not checked ("N" branch from step 611), the service processor then assumes correct data in record N, and processes the data accordingly (step 615). How the data is processed depends on the nature of the record. For example, data from the record might be added to a configuration table used to build a model of computer system 100.

If there are more index entries 309 in table of contents 302, the "Y" branch is taken from step 617, and the next entry is selected. When all entries have been processed, the "N" branch is taken from step 617, and the reading of FRU vital component data is completed.

If, at step 613, it was determined that record N contained invalid data, the "N" branch is taken to step 614. In this case, the service processor determines the criticality of the invalid data. Certain types of vital component data may be so critical to system operation that it is impossible to use the FRU in the absence of the data. For example, a record defining a type of FRU device is generally critical, since the system must be able to tell the difference between a memory card and a processor. Other information, such as a serial number, may be less critical to system operation (although for legal or licensing reasons, it may be determined to disable such a device). Still other information might be useful for system operation, but possible to circumvent to some degree. For example, a record which defines memory access speed of a memory card might be used by the system to configure memory such that faster memory cards are used for more critical data, or card speeds are used to limit processor speeds, or in some other manner. In such a case, the system will still function if the most conservative possible assumption is made with regard to any invalid record from the vital component data.

If the invalid record contains non-critical data, the "N" branch is taken from step 614 and the service processor takes any necessary steps to account for or recover from invalid record N data (step 616). Such steps could be making worst-case assumptions about the missing parameter and/or generating an error message to the system operator. The service processor then continues to step 617 to determine if any more index entries need to be processed.

If, at step 614, the service processor determines that the invalid record contains critical data, or if the "N" branch is taken from either steps 603 or 607, then the FRU vital component data is deemed unusable. In this case, the service processor takes action necessary to contain the error (step 618). Generally, this means that the FRU will be disabled and an appropriate error message will be generated to the system operator.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as system memory 102, control program memory 114, and data storage devices 122, and in FIG. 2 as non-volatile memory 202.

As has been explained above, it is possible to specify a zero length for the table of contents ECC, in effect specifying that there is no ECC for the table of contents. Since there would be little point in protecting any of the data records if the table of contents is not also protected, one might ask why one would use this feature. The ability to specify no ECCs (except only for the header ECC 306, which is always required) allows the same format to be used for memory technologies for which ECCs are desirable, and those for which they are unnecessary. Certain memory technologies may have built-in redundancy, making an explicit ECC unnecessary, or may be considered so inherently reliable as to make ECC unnecessary. By allowing the same universal format to specify a zero-length ECC, a single vital component interpretation routine in the service processor's control program can be used for all FRUs, without regard to the memory technology used for non-volatile memory 202. Additionally, as has been explained, it is possible to protect some records with ECC while others are unprotected. This feature might be useful where some of the data is deemed less critical.

In the preferred embodiment, "descriptors" have certain field components such as names, types, lengths and offsets. In general, it should be understood that a "descriptor" could be any data in a pre-defined format that determines which bytes of the non-volatile memory constitute the corresponding record. Variations of the descriptor data used in the preferred embodiment could include, by way of example and not by way of limitation: a starting address and an ending address; a starting address alone (if, e.g., it is assumed all records are contiguous, so that the start of the next record indicates the end of the current record); a name field alone (in a smart chip or similar application); etc.

Although a specific embodiment of the invention has been disclosed along with certain alternatives, it will be recognized by those skilled in the art that additional variations in form and detail may be made within the scope of the following claims:

What is claimed is:

1. A field replaceable unit for a digital data processing device, comprising:
    at least one functional component for performing a function associated with said field replaceable unit; and
    a non-volatile memory, said non-volatile memory storing:
    (a) a header of pre-defined length, said header comprising a header ECC at a first pre-defined location within said header, a table of contents descriptor at a second pre-defined location within said header, and a table of contents ECC descriptor at a third pre-defined location within said header;
    (b) a table of contents, said table of contents comprising one or more entries, each said entry comprising a respective data record descriptor and a respective corresponding data record ECC descriptor, said table of contents having a location defined by said table of contents descriptor;
    (c) one or more data records, each data record corresponding to a respective entry of said one or more entries in said table of contents, each data record having a location defined by the data record descriptor in said corresponding respective entry in said table of contents;
    (d) if said table of contents ECC descriptor specifies a non-null ECC, a table of contents ECC, said table of contents ECC having a location defined by said table of contents ECC descriptor; and
    (e) if any of said data record ECC descriptors specify a non-null ECC, a respective data record ECC for each data record corresponding to an entry in said table of contents having a data record ECC descriptor specifying a non-null ECC, each data record ECC having a location defined by the corresponding data record ECC descriptor.

2. The field replaceable unit of claim 1, wherein said non-volatile memory is a serial EPROM device.

3. The field replaceable unit of claim 1, wherein said non-volatile memory is a smart chip device.

4. The field replaceable unit of claim 1, wherein:
    said table of contents descriptor comprises an address field and a length field, said address field specifying a starting address of said table of contents, said length field specifying a length of said table of contents; and
    said table of contents ECC descriptor comprises an address field and a length field, said address field specifying a starting address of said table of contents ECC, said length field specifying a length of said table of contents ECC.

5. The field replaceable unit of claim 4, wherein:
    if said length field within said table of contents ECC descriptor specifies a length of zero, then said table of contents ECC descriptor specifies a null table of contents ECC; and
    if said length field within said table of contents ECC descriptor specifies a length other than zero, then said table of contents ECC descriptor specifies a non-null table of contents ECC.

6. The field replaceable unit of claim 4, wherein:
    each data record descriptor in an entry in said table of contents comprises an address field and a length field, said address field specifying a starting address of a data record corresponding to the data record descriptor, said length field specifying a length of the data record corresponding to the data record descriptor; and
    each data record ECC descriptor in an entry in said table of contents comprises an address field and a length field, said address field specifying a starting address of a data record ECC corresponding to the data record ECC descriptor, said length field specifying a length of the data record ECC corresponding to the data record ECC descriptor.

7. The field replaceable unit of claim 4, wherein:
    said table of contents descriptor further comprises a name field, said name field specifying a name for said table of contents.

8. The field replaceable unit of claim 1, wherein said data records contain vital component data for identifying said field replaceable unit to a computer system in which the field replaceable unit is installed.

9. A non-volatile memory device storing structured data, said structured data comprising:
    (a) a header of pre-defined length, said header comprising a header ECC at a first pre-defined location within said header, a table of contents descriptor at a second pre-defined location within said header, and a table of contents ECC descriptor at a third pre-defined location within said header;
    (b) a table of contents, said table of contents comprising one or more entries, each said entry comprising a respective data record descriptor and a respective corresponding data record ECC descriptor, said table of contents having a location defined by said table of contents descriptor;
    (c) one or more data records, each data record corresponding to a respective entry in said one or more entries in said table of contents, each data record having a location defined by the data record descriptor in said corresponding respective entry in said table of contents;
    (d) if said table of contents ECC descriptor specifies a non-null ECC, a table of contents ECC, said table of contents ECC having a location defined by said table of contents ECC descriptor; and
    (e) if any of said data record ECC descriptors specify a non-null ECC, a respective data record ECC for each data record corresponding to an entry in said table of contents having a data record ECC descriptor specifying a non-null ECC, each data record ECC having a location defined by the corresponding data record ECC descriptor.

10. The non-volatile memory of claim 9, wherein said non-volatile memory is a serial EPROM device.

11. The non-volatile memory of claim 9, wherein said non-volatile memory is a smart chip device.

12. The non-volatile memory of claim 9, wherein:
said table of contents descriptor comprises an address field and a length field, said address field specifying a starting address of said table of contents, said length field specifying a length of said table of contents; and
said table of contents ECC descriptor comprises an address field and a length field, said address field specifying a starting address of said table of contents ECC, said length field specifying a length of said table of contents ECC.

13. The non-volatile memory of claim 12, wherein:
if said length field within said table of contents ECC descriptor specifies a length of zero, then said table of contents ECC descriptor specifies a null table of contents ECC; and
if said length field within said table of contents ECC descriptor specifies a length other than zero, then said table of contents ECC descriptor specifies a non-null table of contents ECC.

14. The non-volatile memory of claim 12, wherein:
each data record descriptor in an entry in said table of contents comprises an address field and a length field, said address field specifying a starting address of a data record corresponding to the data record descriptor, said length field specifying a length of the data record corresponding to the data record descriptor; and
each data record ECC descriptor in an entry in said table of contents comprises an address field and a length field, said address field specifying a starting address of a data record ECC corresponding to the data record ECC descriptor, said length field specifying a length of the data record ECC corresponding to the data record ECC descriptor.

15. The non-volatile memory of claim 12, wherein:
said table of contents descriptor further comprises a name field, said name field specifying a name for said table of contents.

16. A computer program product for retrieving structured data, comprising:
a plurality of executable instructions recorded on signal-bearing media, wherein said instructions, when executed by at least one processor of a digital computing device, cause the device to perform the steps of:

(a) reading a header for said structured data at a known location, said header comprising a header ECC at a first pre-defined location within said header, a table of contents descriptor at a second pre-defined location within said header, and a table of contents ECC descriptor at a third pre-defined location within said header;

(b) verifying said header contents using said header ECC;

(c) reading a table of contents at a location defined by said table of contents descriptor, said table of contents comprising one or more entries, each said entry comprising a respective data record descriptor and a respective corresponding data record ECC descriptor;

(d) if said table of contents ECC descriptor specifies a non-null ECC, then reading a table of contents ECC at a location defined by said table of contents ECC descriptor and verifying said table of contents using said table of contents ECC;

(e) for each respective entry of said one or more entries in said table of contents, reading a corresponding data record at a location defined by the respective data record descriptor; and (f) for each respective entry of said one or more entries in said table of contents, if the respective data record ECC descriptor specifies a non-null ECC, then reading a corresponding data record ECC at a location defined by the respective data record ECC descriptor, and verifying the corresponding data record using the corresponding data record ECC.

* * * * *